United States Patent [19]

Winsel

[11] 4,172,909

[45] Oct. 30, 1979

[54] APPLICATION OF ACTIVE MASS TO POROUS ELECTRODE SUPPORT STRUCTURES

[75] Inventor: August Winsel, Kelkheim, Fed. Rep. of Germany

[73] Assignee: Varta Batterie Aktiengesellschaft, Hanover, Fed. Rep. of Germany

[21] Appl. No.: 823,600

[22] Filed: Aug. 11, 1977

[30] Foreign Application Priority Data

Aug. 18, 1976 [DE] Fed. Rep. of Germany ....... 2637059

[51] Int. Cl.$^2$ .......................... B05D 5/12; B05D 3/04; B05D 3/10; C25B 11/04
[52] U.S. Cl. .................................... 427/126; 427/115; 427/243; 427/343; 427/399; 427/430 B; 429/218; 429/223
[58] Field of Search .................... 427/126, 343, 430 B, 427/243, 399, 435, 115; 429/222, 223, 219, 218; 210/52 R

[56] References Cited

U.S. PATENT DOCUMENTS

| 2,646,454 | 7/1953 | Herold | 429/222 |
|---|---|---|---|
| 3,442,710 | 5/1969 | Menard | 427/126 |
| 3,540,931 | 11/1970 | Loukomsky | 427/126 |
| 4,000,033 | 12/1976 | Nicolle | 210/42 R |

OTHER PUBLICATIONS

Encyclopedia of Science and Technology, p. 577, McGraw Hill, 1977.
Chemical Engineers Handbook, 4 Ed. Perry McGraw Hill, pp. 19–52.

Primary Examiner—Michael F. Esposito
Assistant Examiner—Richard Bueker
Attorney, Agent, or Firm—Weiser, Stapler & Spivak

[57] ABSTRACT

Precipitation of metal salts from solution onto the electrode support structure takes place in several consecutive stages, with the precipitating solution caused to move countercurrent to the electrodes being impregnated.

6 Claims, No Drawings

APPLICATION OF ACTIVE MASS TO POROUS ELECTRODE SUPPORT STRUCTURES

The invention relates to a method for applying active mass to the porous electrode support structure or framework of galvanic elements, and particularly of alkaline storage batteries, by soaking the electrode support structure with a metal salt solution from which the metal alloys forming the active mass are precipitated by means of an alkaline bath.

To introduce active mass into porous electrode bodies, particularly sinter electrode support structures for alkaline storage batteries, there are used on a large scale the so-called soaking methods. In these methods, the nickel sinter support structures are repeatedly soaked with solutions of simple metal salts, if necessary at elevated temperature and with application of over- or underpressure. They are then dried and the fixated metal salt is transformed into the corresponding metal oxide or metal hydroxide by treatment with strong alkaline baths, in which the electrodes are immersed. It is essential that the anions or organic or inorganic acids which remain in the active mass and in the electrode support structure be removed because their presence in the storage battery causes malfunctions. Therefore, they are removed after each soaking, but at least after the required quantity of active mass has been applied to the electrode support structure, to the greatest extent possible by subsequently performing a time-consuming rinsing with water.

In the manufacture of a nickel/cadmium storage battery, cadmium nitrate or nickel nitrate solutions are customarily used as metal salt solutions for the treatment of the sinter electrode support structures. Thereafter there takes place precipitation, particularly with NaOH, and a washing step as well as renewed drying. This process is repeated several times, up to sevenfold, depending upon the intended utilization of the finished electrode. With the passage of time this carries a rise in the nitrate concentration in the precipitating bath, i.e., of the $NaNO_3$ concentration in the NaOH solution. This leads to a continuously changing content of $NaNO_3$ and therefore also of metal nitrate in the precipitation product.

In practice the precipitating solution is changed when about 50% of the initial NaOH has been consumed through formation of $NaNO_3$, even though for the sake of a lower consumption of chemicals, it would be more desirable to utilize the precipitating solution up to higher concentrations of nitrate content.

Militating against this is the fact that the quality of the electrodes is gravely impaired by high nitrate content. Therefore, for the sake of a high-quality finished product, a lower nitrate content must be present.

The elimination of high nitrate content after the final soaking steps by means of washing steps is extraordinarily time consuming and costly. For this reason, too, only low nirate content should exist in the electrode when it leaves the impregnation equipment.

Accordingly, it is a primary object of the invention to provide a method which leads to better utilization of the precipitating solution and less contamination of the electrodes with nitrate during multi-stage impregnation processes.

This and other objects which will appear are accomplished in accordance with the invention by carrying out the introduction of the metal salt solutions and their precipitation in several stages, in which the precipitating solution is caused to move in counter-current relationship to the electrodes which are to be impregnated.

By so moving the precipitating solution in counter-current relationship to the electrodes to be impregnated, in the consecutively occurring impregnation states, the result which is achieved is that the major portion of the precipitation takes place with previously contaminated precipitating solutions. On the other hand, the material which is almost completely impregnated can yield up the nitrate which it contains by dwelling in a clean precipitating, or NaOH solution. This movement of precipitating solution in counter-current fashion can be carried out in two or more stages. By so doing, there is produced an electrode with very low nitrate content, i.e., of uniform quality, and with maximum utilization of the initial precipitating solution.

The following discussion further explains the process embodying the invention by means of an example.

Assume, for example, that the impregnation of the sinter support structure or framework is performed in six stages, in each of which a predetermined quantity of nickel nitrate is introduced into the support structure. Under these circumstances, the precipitation in the two final stages can take place, for example, with 11 N NaOH, i.e. very clean sodium baths. On the other hand, in the third and fourth stages, the previously used sodium bath, i.e., one of about 6 N NaOH is utilized, the remainder being already $NaNO_3$ through precipitation. Similarly, in the first and second stage there is used about 2 N NaOH, the remainder being again $NaNO_3$. The precipitations take place in each case at a bath temperature of about 80° C. and the dwell time in each case is about 15 minutes. Especially when a sinter electrode support structure in strip form is moved continuously through the impregnating and precipitating solutions, complete transformation of the nickel nitrate into the desired nickel hydroxide can be achieved by movement of the precipitating solution counter to the electrode strip within the above-mentioned dwell time. This is so even though after precipitation in the first and second stages, for example, some nitrate content still remains in the electrode support structure.

I claim:

1. In a method for introducing active mass constituted of predetermined metal compounds into porous electrode support structures for galvanic elements, which method includes soaking the electrode support structure in a solution of a salt of said metal, and contacting the soaked support structure with an alkaline bath to precipitate said metal through reaction between the metal salt and the alkaline bath, the improvement wherein for any given one of the electrodes to be impregnated the application of the metal salt solution and the precipitation reaction takes place in a plurality of sequential stages, in which the precipitating bath is moved through and used in said stages in a sequence opposite to that for the electrodes which are to be impregnated whereby the metal salt becomes progressively more and more reacted into the active mass compound in said sequential stages and the bath becomes progressively more and more reacted into an alkali salt in said opposite sequence stages.

2. The method of claim 1, wherein the galvanic elements are alkaline storage batteries.

3. The method of claim 2, wherein the precipitating bath in the final one of said sequential stages is about 11 N NaOH.

4. The method of claim 3, wherein the bath in the first one of said sequential stages is about 2 N NaOH.

5. The method of claim 3, wherein the number of stages is about six.

6. The method of claim 5, wherein the bath temperature is about 80° C. and the dwell time at each stage is about 15 minutes.

* * * * *